United States Patent
Cheung

(10) Patent No.: US 10,814,959 B2
(45) Date of Patent: Oct. 27, 2020

(54) TRANSLATING FAN BLADES FOR AN AIRCRAFT TAIL MOUNTED FAN ASSEMBLY

(71) Applicant: General Electric Company, Schenectady, NY (US)

(72) Inventor: Lawrence Chih-hui Cheung, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 936 days.

(21) Appl. No.: 15/282,056

(22) Filed: Sep. 30, 2016

(65) Prior Publication Data

US 2018/0093754 A1 Apr. 5, 2018

(51) Int. Cl.
| | | |
|---|---|---|
| B64C 11/28 | (2006.01) | |
| B64D 27/10 | (2006.01) | |
| B64D 27/24 | (2006.01) | |

(52) U.S. Cl.
CPC .............. *B64C 11/28* (2013.01); *B64D 27/10* (2013.01); *B64D 27/24* (2013.01); *Y02T 50/64* (2013.01); *Y02T 50/66* (2013.01)

(58) Field of Classification Search
CPC ......... B64C 11/28; B64C 21/00; B64D 27/10; B64D 27/24; Y02T 50/66; Y02T 50/64
See application file for complete search history.

(56) References Cited

U.S. PATENT DOCUMENTS

| | | | | |
|---|---|---|---|---|
| 2,979,288 A * | 4/1961 | Klein | .................... | B64C 11/003 244/55 |
| 3,128,829 A * | 4/1964 | Young | .................... | B64C 11/003 416/88 |
| 6,065,933 A | 5/2000 | Secord | | |
| 6,972,498 B2 * | 12/2005 | Jamieson | .............. | F03D 7/0236 290/44 |
| 7,857,591 B2 | 12/2010 | Gajewski et al. | | |
| 7,926,760 B2 * | 4/2011 | Gall | .......................... | B64C 3/10 244/1 N |
| 8,152,096 B2 | 4/2012 | Smith | | |

(Continued)

FOREIGN PATENT DOCUMENTS

| | | |
|---|---|---|
| CN | 201385780 Y | 1/2010 |
| CN | 204110358 U | 1/2015 |

(Continued)

OTHER PUBLICATIONS

Huete et al., "A novel concept for the next generation civil supersonic transport propulsion system: the retractable fan", Aircraft Engineering and Aerospace Technology, vol. 69, Issue: 6, pp. 512-517, 1997.

*Primary Examiner* — Joshua T Semick
(74) *Attorney, Agent, or Firm* — Dority & Manning, P.A.

(57) ABSTRACT

The present disclosure is directed to a fan section mounted to an aircraft tail section. The fan section defines a radial direction, an axial direction and a circumferential direction. The fan section includes a shaft extending generally along a longitudinal axis, and a plurality of fan blades rotatable with the shaft about the longitudinal axis. Each fan blade defines an outer end along the radial direction. One or more of the plurality of fan blades translates a respective outer end from a first radial position to a second radial position.

18 Claims, 4 Drawing Sheets

(56) References Cited

U.S. PATENT DOCUMENTS

| | | | |
|---|---|---|---|
| 8,459,948 B2 * | 6/2013 | Caraballoso | B64C 27/46 416/143 |
| 8,784,057 B2 * | 7/2014 | Podgurski | B64C 27/00 416/142 |
| 8,821,118 B2 * | 9/2014 | Moore | B64C 11/003 416/1 |
| 9,573,693 B2 * | 2/2017 | Cazals | B64C 39/12 |
| 9,701,406 B2 * | 7/2017 | Robertson | B64C 29/0033 |
| 10,315,760 B2 * | 6/2019 | Bevirt | B64C 29/0033 |
| 2009/0274557 A1 | 11/2009 | Vasyl | |
| 2013/0115083 A1 * | 5/2013 | Vuillemin | B64C 11/003 416/1 |

FOREIGN PATENT DOCUMENTS

| | | | | |
|---|---|---|---|---|
| DE | 4231676 C1 * | 3/1994 | | B64C 11/28 |
| WO | 2014072615 A1 | 5/2014 | | |

* cited by examiner

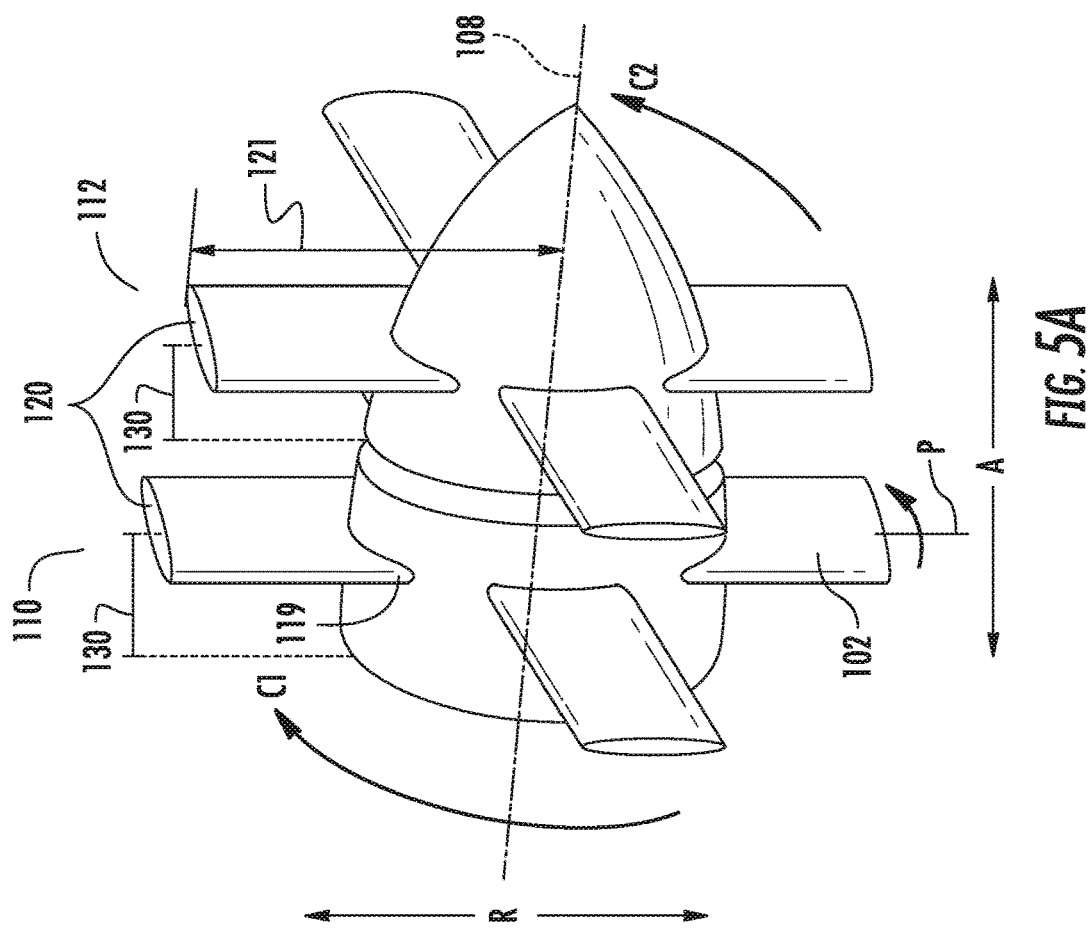
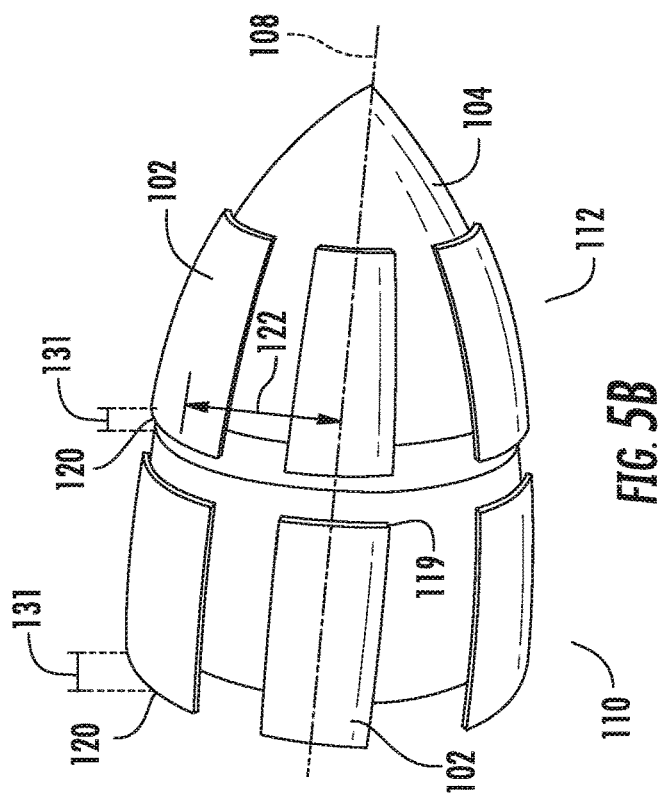

TRANSLATING FAN BLADES FOR AN AIRCRAFT TAIL MOUNTED FAN ASSEMBLY

FIELD OF THE INVENTION

The present invention relates generally to a fan section of an aircraft tail section.

BACKGROUND OF THE INVENTION

Aircraft and engine designs are challenged to drive ever-increasingly toward lower fuel consumption and emissions. One known solution to increase aircraft efficiency is to mount a hybrid-electric fan section at or near the tail-section of an aircraft.

However, similar to a conventional, under-wing fan configuration, the diameter of a tail mounted fan assembly is limited by the available ground clearance of an aircraft during takeoff roll and landing. A known solution is to use a fan of a smaller diameter. However, a smaller fan diameter may not capture a desired portion of a fluid boundary layer from an aircraft fuselage or may sacrifice too much thrust output for the added weight and complexity of a tail mounted fan assembly.

Therefore, a need exists for a fan assembly mounted to an aircraft tail section that may overcome fan diameter restrictions due to aircraft ground clearance.

BRIEF DESCRIPTION OF THE INVENTION

Aspects and advantages of the invention will be set forth in part in the following description, or may be obvious from the description, or may be learned through practice of the invention.

The present disclosure is directed to a fan section mounted to an aircraft tail section. The fan section defines a radial direction, an axial direction and a circumferential direction. The fan section includes a shaft extending generally along a longitudinal axis, and a plurality of fan blades rotatable with the shaft about the longitudinal axis. Each fan blade defines an outer end along the radial direction. One or more of the plurality of fan blades translates a respective outer end from a first radial position to a second radial position.

A further aspect of the present disclosure is directed to an aircraft including a fan section, a powerplant including gas turbine engine, and a fuselage extending between a forward end and an aft end.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 5A is a perspective view of an exemplary embodiment of a fan section showing a plurality of exemplary translating fan blades at a first radius and a first axial position;

FIG. 5B is a perspective view of an exemplary embodiment of the fan section of FIG. 5A at a second radius and a second axial position;

Figure 1A:
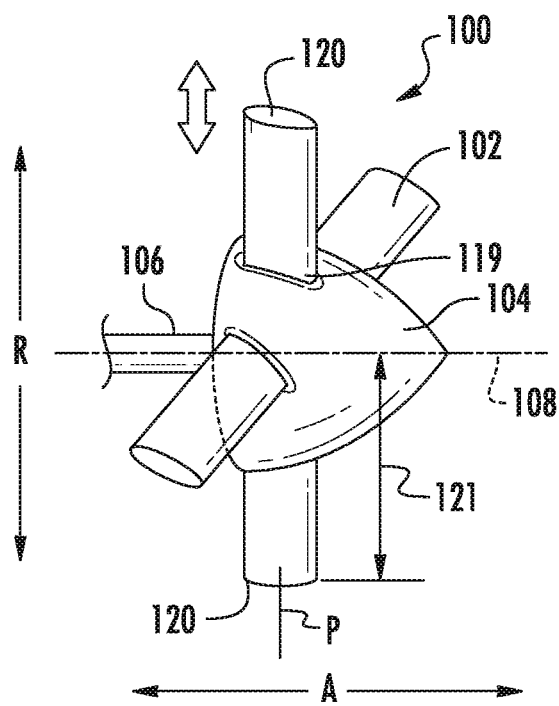
FIG. 1A is a perspective view of an exemplary embodiment of an aircraft tail mounted fan section showing a plurality of fan blades at a first radius.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

A fan section positioned on an aircraft tail section including a plurality of translating fan blades is generally provided. The fan section including a plurality of translating fan blades may overcome fan diameter restrictions due to aircraft ground clearance by radially translating the fan blades from a first radius to a second radius. The aircraft tail mounted fan section includes a plurality of fan blades coupled to a hub and a shaft, in which a radial end of the fan blades translates from the first radial position to the second radial position.

The fan section including a plurality of translating fan blades may provide a large fan diameter to capture and energize low momentum boundary layer fluid from a surface of an aircraft fuselage while removing restrictions on fan diameter size due to ground clearance during takeoff roll and landing.

Figure 1B:
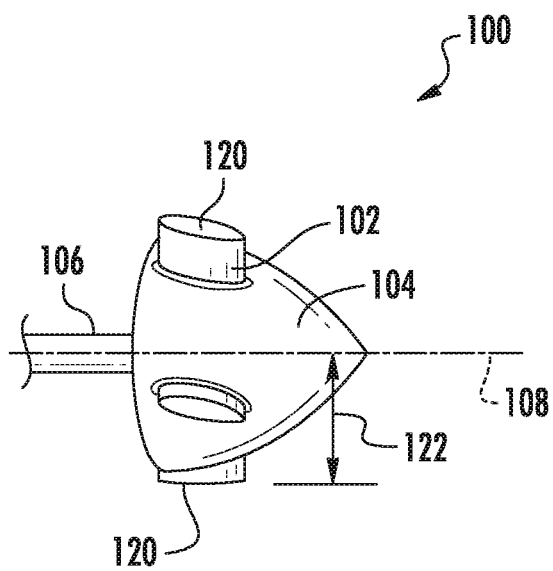
FIG. 1B is a perspective view of an exemplary embodiment of the fan section of FIG. 1A showing the plurality of fan blades at a second radius.
Figure 6:
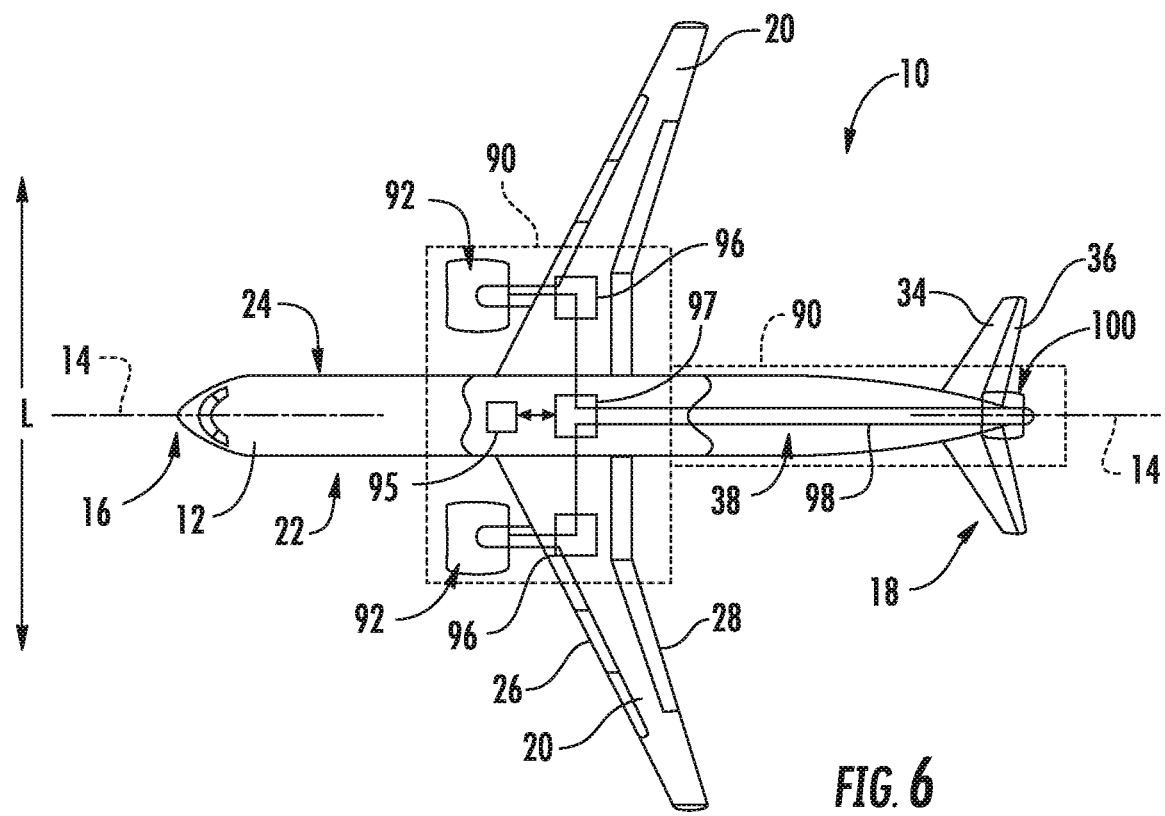
FIG. 6 is a top view of an exemplary embodiment of an aircraft including an exemplary embodiment of a tail mounted fan section.
Figure 7:
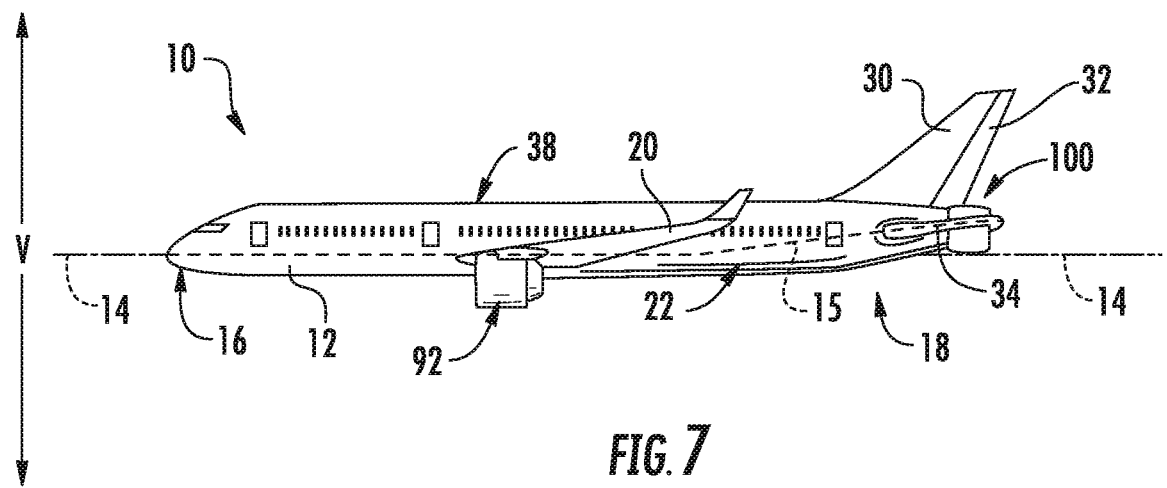
FIG. 7 is a port side view of the exemplary aircraft shown in FIG. 5.

Referring now to the drawings, FIGS. 1A and 1B are perspective views of an exemplary embodiment of a fan section 100 mounted onto a tail section of an aircraft (see FIGS. 6 and 7). As will be described in greater detail below with reference to FIGS. 6 and 7, the fan section 100 may ingest and re-energize a boundary layer airflow over an aft end of a fuselage of an aircraft to which it is mounted. The fan section 100 generally defines a radial direction R, and a circumferential direction C, and a longitudinal axis 108. The fan section 100 includes a plurality of fan blades 102 rotatable with and a shaft 106 about the longitudinal axis 108. Each fan blade 102 defines an outer end 120 and a root 119 along the radial direction R. At least one fan blade 102 of the fan section 100 translates the outer end 120 from a first radial position 121 (shown in FIG. 1A) to a second radial position 122 (shown in FIG. 1B). For the embodiment depicted, each fan blade 102 of the plurality fan blades 102 is coupled to a hub 104 and arranged along the circumferential direction C. The hub 104 and the shaft 106 are rotatable about the longitudinal axis 108, and more particularly, each of the plurality of fan blades 102 is rotatable with the shaft 106 about the longitudinal axis 108. Although further described below generally with reference to an open rotor fan section mounted to an aircraft fuselage tail section, the present disclosure is also applicable to ducted fans and propellers. Furthermore, references to gas turbine engines may include turbomachinery configurations such as, but not limited to, turbofans, turboprops, turboshafts, and turbojets.

The outer end 120 of the fan blade 102 is the outermost portion of the fan blade 102 along the radial direction R relative to the longitudinal axis 108 (e.g. the airfoil tip). The root 119 of the fan blade 102 is the inner most portion of the fan blade 102 along the radial direction R relative to the longitudinal axis 108. In the embodiments shown in FIGS. 1A and 1B, the first radial position 121 refers to the outer end 120 of the fan blade 102 at its outermost position. The second radial position 122 refers to the outer end 120 of the fan blade 102 at its innermost position. For the embodiment depicted, the fan blade 102 translates generally along the radial direction R between an extended position (at the first radial position 121) and a retracted position (at the second radial position 122). Notably, for the embodiment depicted, when in the retracted position, the outer end 120 of the fan blade 102 is positioned proximate the hub 104 such that the second radial position 122 may be approximately equal to an outer diameter of the hub 104. It should be appreciated, however, that although not depicted, in other exemplary embodiments, the second radial position 122 may be less than the outer diameter of the hub 104, such that the fan blade 102 is completely retracted within the hub 104 when in the retracted position. Additionally, it should be appreciated, that depending on a particular configuration of the fan section 100, at least in certain embodiments, the second radial position 122 may be less than about half of the first radial position 121.

It should be appreciated, however, that although for the embodiment depicted in FIGS. 1A and 1B, the fan blade 102 is substantially completely retracted within the hub 104 when moved to the retracted position (FIG. 1B), in other embodiments, the retracted position may refer to any other suitable position of the fan blade 102 wherein the fan blade 102 is moved inward along the radial direction R. More specifically, the retracted position may refer to any other suitable position wherein the outer end 120 of the fan blade 102 is positioned inward of the outer end 120 of the fan blade 102 when in the extended position (FIG. 1A). Accordingly, the retracted position may represent a 25% decrease in a radius of the fan blades 102 when in the first radial position 121, a 40% decrease in a radius of the fan blades 102 when in the first radial position 121, a 50% decrease in a radius of the fan blades 102 when in the first radial position 121, or any other suitable decrease in a radius of the fan blades 102 when in the first radial position 121.

The translating fan section 100 may provide a necessary amount of ground clearance for a large diameter fan to be mounted to the tail section of an aircraft while avoiding fan blade 102 contact with the ground during takeoff or landing. For example, the fan section 100 may translate the outer end 120 of the fan blade 102 along the radial direction R from an extended position to a retracted position, wherein the fan blade 120 is moved to the second radial position 122, which may provide sufficient ground clearance during takeoff or landing.

The translating fan section 100 may further provide an adjustment in radial position of the fan blades 102 to more efficiently capture the fluid boundary layer from an aircraft fuselage as flight conditions change (e.g. during takeoff, or climb, or cruise, or approach, or landing, or changes in fluid boundary layer condition, etc.). For example, the fan blade 102 may translate along the radial direction R to a partially retracted position. More specifically, the fan blade 102 may translate inwardly along the radial direction R to a position representing a 25% decrease in a radius of the fan blades 102 when in the first radial position 121, a 33% decrease in a radius of the fan blades 102 when in the first radial position 121, or a 50% decrease in a radius of the fan blades 102 when in the first radial position 121. Additionally, it should be appreciated that the fan blade 102 may further translate inwardly along the radial direction R to any other suitable location between the retracted position and the extended position.

For the various embodiments depicted in reference to the figures and described herein, the fan section 100 may include a variable pitch fan in which each translating fan blade 102 and each radially stationary fan blade 103 (described in greater detail below) is rotatable relative to the hub 104 about a pitch axis P as shown in FIGS. 5A and 5B. Each fan blade 102, 103 may independently rotate about the pitch axis P by an actuation member operatively coupled to the fan blades 102, 103 or the actuation member may collectively vary the pitch of the fan blades 102, 103 in unison. The fan blades 102, 103 may rotate into a "feathered" position, i.e. the fan blades 102, 103 may be rotated about pitch axis P to reduce fluid drag. In one embodiment, the translating fan blades 102 may collectively vary the pitch differently than the radially stationary fan blades 103. The fan blades 102, 103 may be feathered while not in operation, e.g. when the fan blades 102, 103 are circumferentially stationary, or when the translating fan blades 102 are in a radially inward position.

Figure 2A:
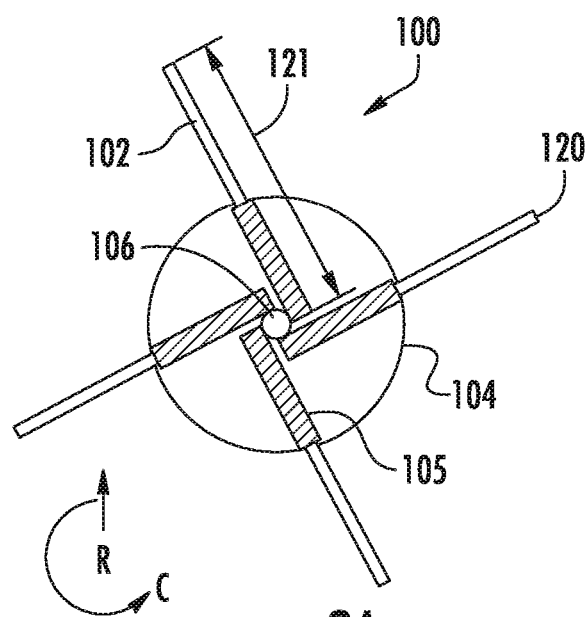
FIG. 2A is a cross sectional view of an exemplary embodiment of the fan section of FIG. 1A.
Figure 2B:
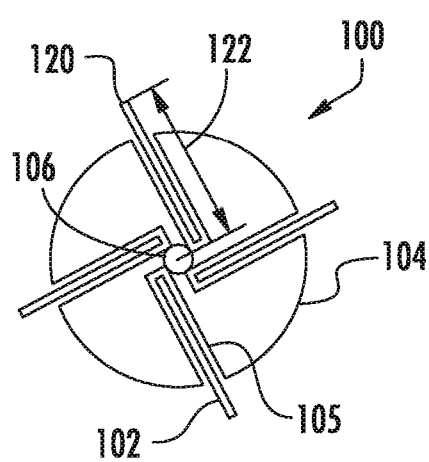
FIG. 2B is a cross sectional view of an exemplary embodiment of the fan section of FIG. 2A.

Referring now to FIGS. 2A and 2B, axial, cross sectional views of an exemplary embodiment of a fan section 100 is provided, including aspects of the exemplary embodiment described in regard to FIGS. 1A and 1B. However, the exemplary fan section 100 of FIGS. 2A and 2B includes a hub 104 further including a sheath 105 that is disposed generally along the radial direction R at least partially within the hub 104. More specifically, the fan section 100 depicted includes a plurality of sheaths 105, with each sheath 105 coupled to a respective translating fan blade 102. Each sheath 105 translates a respective fan blade 102 inward and outward of the sheath 105 along the radial direction R from an extended position in which the fan blade 102 is in a first radial position 121 (shown in FIG. 2A) to a retracted position in which the fan blade 102 is in a second radial position 122 (shown in FIG. 2B). Each sheath 105 may include an actuator, spring, gear-driven device, or hydraulic or pneumatic device, etc. to extend or retract the fan blade 102 from the first radial position 121 to the second radial position 122 (not shown). In addition, the fan section 100 may include a locking mechanism to lock the fan blade 102 in position. The locking mechanism may be operable with the actuator, or alternatively may be operable directly with the fan blade 102. For example, the locking mechanism may be a pneumatically, hydraulically, or electrically actuated pin or clamp operable with the fan blade 102.

In the embodiment shown in FIGS. 2A and 2B, the sheath 105 is coupled to the shaft 106 of the fan section 100. However, in other embodiments, the sheath 105 may additionally, or alternatively, be coupled to the hub 104. Further, it should be appreciated that the sheath 105 may be coupled to the root 119 of the fan blade 102. In still other embodiments, the sheath 105 may be coupled on one or more sides of the fan blade 102 such that the fan blade 102 slides, translates, or articulates within the sheath 105. For example, the sheath 105 may define a groove, slot, rail, or track within the sheath 105 along which the fan blade 102 may translate along the radial direction R.

Figure 3A:
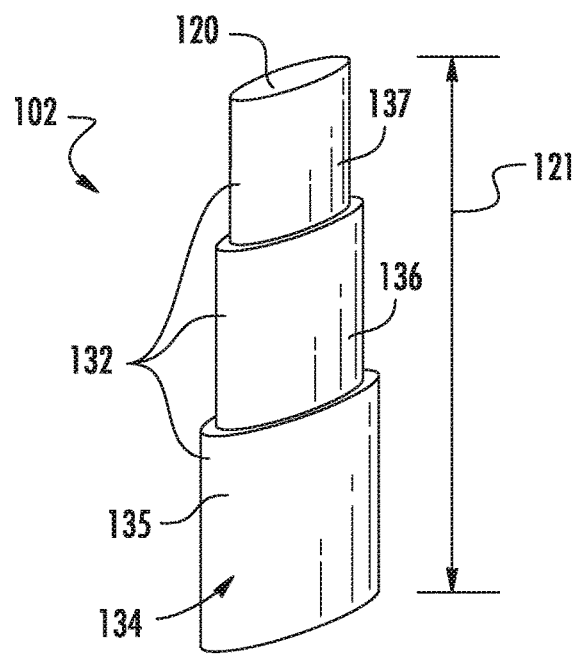
FIG. 3A is a perspective view of an exemplary embodiment of a fan blade of the fan section at a first radius.
Figure 3B:
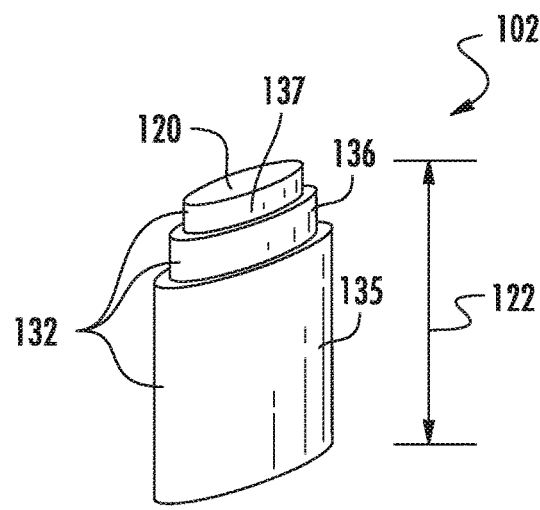
FIG. 3B is a perspective view of an exemplary embodiment of the fan blade of FIG. 3A at a second radius.

Referring now to FIGS. 3A and 3B, an exemplary embodiment of a translating fan blade 102 is provided in accordance with another exemplary embodiment of the present disclosure. For the embodiment of FIGS. 3A and 3B, the fan blade 102 includes a plurality of radially nested portions 132. One or more of the plurality of radially nested portions 132 translates along the radial direction R inward and outward from one another to translate the fan blade 102 from an extended position in which the outer end 120 is in a first radial position 121 (shown in FIG. 3A) to a retracted position in which the outer end 120 is in a second radial position 122 (shown in FIG. 3B). The plurality of radially nested portions 132 may be configured similarly as the sheath 105 shown and described in regard to FIGS. 2A and 2B. For example, actuators, springs, gear-driven devices, or hydraulic or pneumatic devices, etc. may extend or retract or lock the plurality of radially nested portions 132 from the first radial position 121 to the second radial position 122.

In the embodiments shown in FIGS. 3A and 3B, the plurality of nested portions 132 includes three portions 132, one or more of which translates along the radial direction R inward and outward from another. Specifically, for the embodiment depicted, the fan blade 102 includes a first portion 135, a second portion 136, and a third portion 137, each of which are arranged generally along the radial direction R. When the fan blade 102 is in the extended position each of the first, second, and third portions 135, 136, 137 are positioned substantially outward from one another. By contrast, when the fan blade 102 is moved to the retracted position, the third portion 137 is positioned substantially within the second portion 136, and the second portion 136 is positioned substantially within the first portion 135.

It should be appreciated, however, that in other embodiments, the plurality of nested portions 132 may include two, or four, or five, etc. portions 132 nesting into one another. It should be appreciated that a larger quantity of portions 132 may mitigate features that define steps, gaps, waterfalls, walls, or other features that create surface interruptions that may disrupt laminar flow, or otherwise promote turbulent flow, or otherwise induce flow separation across a surface 134 of the fan blade 102.

Figure 4A:
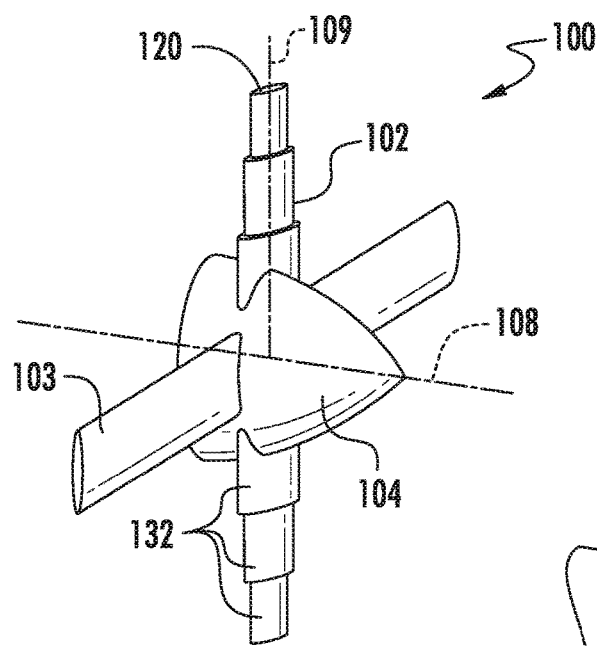
FIG. 4A is a perspective view of an exemplary embodiment of a fan section incorporating the fan blade of FIG. 3A at a first radius.
Figure 4B:
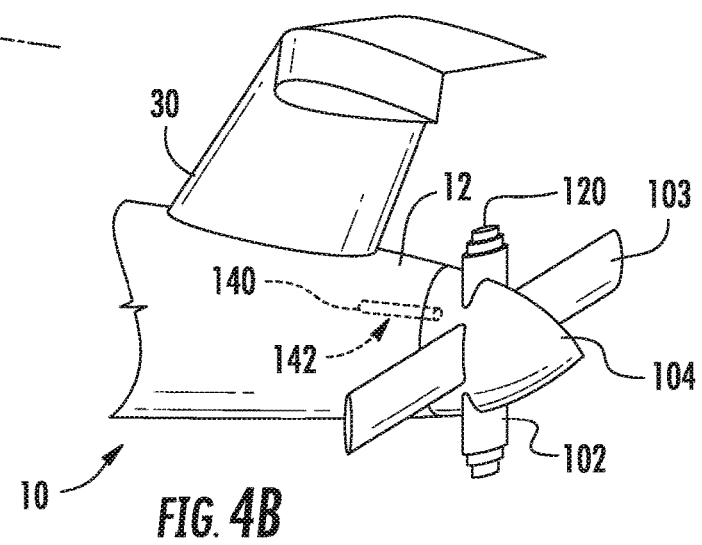
FIG. 4B is a perspective view of an exemplary embodiment of the fan section of FIG. 4A including the fan blade of FIG. 3B at a second radius.

Referring now to FIGS. 4A and 4B, an exemplary embodiment of a fan section 100 in accordance with another exemplary embodiment of the present disclosure is provided. More particularly, FIG. 4A depicts a fan section 100 in accordance with an exemplary embodiment of the present disclosure, including one or more translating fan blades 102 in an extended position, and FIG. 4B depicts a fan section 100 in accordance with an exemplary embodiment of the present disclosure attached to an aircraft 10, the fan section 100 including one or more translating fan blades 102 in a retracted position. The exemplary fan section 100 of FIGS. 4A and 4B may be configured in substantially the same manner as one or more of the exemplary fan sections 100 described above with reference to FIGS. 1A, 1B, 2A, 2B, 3A, and 3B. Accordingly, the same or similar numbers may refer to same or similar part.

For the embodiment of the fan section 100 depicted in FIGS. 4A and 4B, the fan section 100 includes a plurality of fixed fan blades 103 in addition to a plurality of translating fan blades 102. Each of the plurality of translating fan blades 102 includes a respective plurality of nested portions 132 configured in a similar manner as described in regard to FIGS. 3A and 3B. In the embodiments shown in FIGS. 4A and 4B, the plurality of nested portions 132 is coupled to the hub 104. In other embodiments, the plurality of nested portions 132 may be coupled to the shaft 106.

In other embodiments of the fan section 100, the plurality of fan blades 102 may include a nested portion 132 coupled to the hub 104, with the hub 104 including a sheath 105 at least partially radially within the hub 104, such as shown and described in regard to FIGS. 2A and 2B. Additionally, although not depicted, one or more of the nested portions 132 may include features for translating such nested portions, such as one or more actuators, springs, or a gear-driven mechanism to extend or retract the plurality of nested portions 132 from an extended position in which the outer end 120 of the fan blade 102 is in a first radial position 121 to a retracted position in which the outer end 120 of the fan blade 102 is in a second radial position 122. Furthermore, the plurality of nested portions 132 and the sheath 105 may be a single assembly such that a common set of actuators, springs, or gear-driven system extends or retracts the plurality of nested portions 132 and the sheath 105.

As stated, in the embodiments shown in FIGS. 4A and 4B, the fan section 100 includes translating fan blades 102 and radially stationary fan blades 103. As is depicted schematically, the embodiment shown in FIG. 4B may further include a locking mechanism 140 to position the fan blades 102, 103 in a stationary position along the circumferential direction C (i.e. the fan section 100 not rotating about the longitudinal axis 108). For example, the locking mechanism 140 may be a pin 142 attached to the fuselage 12 and extendable into an opening defined by the hub 104 by an actuator. The locking mechanism 140 may further position at least one translating fan blade 102 within a bottom hemisphere defined by the fan section 100. More specifically, the locking mechanism 140 may position at least one translating fan blade at 180° from a vertical reference line 109, as is depicted in FIG. 4A. For example, the locking mechanism may position at least one translating fan blade 102 between about 90° and about 270° from the vertical reference line 109. In addition, the fan section of FIGS. 4A and 4B may include a locking mechanism (not shown) for locking one or more of the translating fan blades 102 in position. This configuration may provide sufficient ground clearance for the fan section 100 while minimizing the complexity, weight, or cost of the fan section 100 due to the amount of hardware associated with each translating fan blade 102 (e.g. plurality of nested portions 132, or sheath 105, or actuators, springs, or gear-driven systems associated with each translating fan blade 102).

Referring still to the embodiments shown in FIGS. 4A and 4B, the locking mechanism 140 may position a translating fan blade 102 at a stationary position along the circumferential direction C at top dead center (TDC) of the fan section 100 (i.e. 0 degrees relative to the vertical reference line 109). For example, where the fan section 100 includes three or more fan blades 102, 103, a translating fan blade 102 may be positioned at TDC. Furthermore, the translating fan blades 102 may be circumferentially locked between 90 and 270 degrees.

In the embodiment shown in FIGS. 4A and 4B, the fan section 100 may minimize fan unbalance by positioning translating fan blades 102 in diametric opposition to one another. In one embodiment, the fan section 100 may position the translating fan blades 102 at 0 degrees and 180 degrees relative to the vertical reference line 109. In another embodiment, the fan section 100 may include six fan blades 102, 103, in which translating fan blades 102 are positioned at 150 degrees and 210 degrees and are balanced by diametrically opposite translating fan blades 102 at 330 degrees and 30 degrees, while also positioning radially stationary fan blades 103 at 90 degrees and 270 degrees relative to the hub 104.

The fan section 100 shown and described according to various embodiments herein may enable a tail mounted fan section 100 to include large radius translating fan blades 102 that avoid contact with the ground during aircraft takeoff and landing. Additionally, sufficient ground clearance may be provided while also operating the fan section 100 at a fan diameter to capture a desired portion of an aircraft fuselage fluid boundary layer. Furthermore, the fan section 100 and its various embodiments described herein may enable three or more large-radius fan blades to be installed onto a tail mounted fan section 100 while maintaining sufficient ground clearance during takeoff and landing. For example, in one embodiment, the fan blades 102 may be in a locked position during takeoff or landing such that the translating fan blades 102 between 90 and 270 degrees are translated to a retracted position such that they define a second radial position 122 that provides sufficient ground clearance. In another embodiment, the fan blades 102 may be translated to a partially retracted position such that they define a second radial position 122 that is smaller than a first radial position 121 defined when in the fully extended position such that the fan blades 102 may continue generating propulsive force during takeoff and landing while also maintaining sufficient ground clearance.

Referring now to FIGS. 5A and 5B, a fan section 100 in accordance with another exemplary embodiment of the present disclosure is provided. Specifically, FIG. 5A depicts the exemplary fan section 100 including a plurality of translating fan blades 102 in an extended position, and FIG. 5B depicts the exemplary fan section including a plurality of translating fan blades in a retracted position. The exemplary fan section 100 depicted in FIGS. 5A and 5B may be configured in substantially the same manner as exemplary engine described above with reference to FIGS. 1A and 1B. Accordingly, the same or similar numbers may refer to same or similar part.

For example, the exemplary fan section 100 depicted defines an axial direction A, radial direction R, and a circumferential direction C, and further includes a plurality of fan blades 102 rotatable with a shaft 106. However, for the embodiments shown in FIGS. 5A and 5B, the fan section 100 includes a contrarotating fan configuration that may be applied with various embodiments of the present disclosure. More specifically, the fan section 100 includes a forward fan having a first plurality of fan blades 110 and an aft fan including a second plurality of fan blades 112. The first plurality of fan blades 110 rotate in a first circumferential direction C1 and the second plurality of fan blades 112 rotate in a second circumferential direction C2. The second circumferential direction C2 is opposite of the first circumferential direction C1.

Similar to the embodiments described above, each of the first plurality of fan blades 110 and the second plurality of fan blades 112 are configured as translating fan blades 102. More specifically, each of the first and second plurality of fan blades 110, 112 may translate between an extended position (FIG. 5A) and a retracted position (FIG. 5B). Each translating fan blade 102 of the first and second plurality of fan blades 110, 112 defines an outer end 120 and a root 119 along the radial direction R. Notably, instead of extending generally along the radial direction R between the extended and retracted positions (see FIGS. 1-4) the exemplary first and second plurality of fan blades 110, 112 pivot between the extended and retracted positions. Accordingly, the translating fan blades 102 of FIGS. 5A and 5B may also be referred to as folding, or hinged fan blades. As is depicted, the first and second plurality of fan blades 110, 112 translate the outer end 120 of at least one fan blade 102 from a first axial position 130 and first radial position 121 when in the extended position (shown in FIG. 5A) to a second axial position 131 and second radial position 122 when in the retracted position (shown in FIG. 5B). In the embodiment shown in FIGS. 5A and 5B, the translating fan blades 102 include a hinging mechanism to translate the outer end 120 of at least one fan blade 102 from the first radial position 121 to the second radial position 122 by rotating the outer end 120 forward or aft along the longitudinal axis 108 from the first axial position 130 to the second axial position 131.

Although not depicted, in certain embodiments of the present disclosure, the fan blades 102 may include an actuator, spring, or gear-driven system to translate the outer end 120 of the fan blade 102 from the first axial position 130 to the second axial position 131 by pivoting or rotating the fan blade 102. As the outer end 120 of the fan blade 102 is being translated relative to the longitudinal axis 108, this motion may be referred to as an axial translation. Additionally, though FIGS. 5A and 5B show the outer end 120 of the fan blades 102 translating forward or upstream from the first axial position 130 to the second axial position 131, the fan section 100 may translate the outer end 120 of the fan blades 102 downstream from the first axial position 130 to the second axial position 131. Moreover, the fan section 100 of FIGS. 5A and 5B may further including a locking mechanism (not shown) for locking the translating fan blades 102 in position. The locking mechanism may be operable directly with the fan blades 102, or alternatively may be operable with the actuator or hinge device.

Referring now to FIG. 6, a top view of an exemplary aircraft 10 as may incorporate various embodiments of a fan section 100 described herein is provided. Additionally, FIG. 7 provides a port side view of the aircraft 10 as illustrated in FIG. 6. As shown in FIGS. 6 and 7 collectively, the aircraft 10 includes a powerplant 90, a fuselage 12, and a plurality of wings 20. The aircraft 10 further includes the fan section 100, according to various embodiments shown in FIGS. 1-4 and described herein, positioned aft of a vertical stabilizer 30 included with the fuselage 12.

Referring still to FIGS. 6 and 7, the aircraft 10 defines a longitudinal centerline 14 that extends therethrough, a vertical direction V, a lateral direction L, a forward end 16, and an aft end 18. Moreover, the aircraft 10 defines a mean line 15 extending between the forward end 16 and aft end 18 of the aircraft 10. As used herein, the "mean line" refers to a midpoint line extending along a length of the aircraft 10, not taking into account the appendages of the aircraft 10 (such as the wings 20 and stabilizers discussed below).

The fan section 100 is mounted at the aft end 18 of the aircraft 10. More specifically, for the embodiment depicted, the fan section 100 is aft of the vertical stabilizer 30. Further, the fan section 100 depicted may ingest and consume at least a portion of air forming a boundary layer over the fuselage 12 of the aircraft 10. Specifically, for the embodiment depicted, the fan section 100 is fixedly connected to the fuselage 12 at the aft end 18, such that the fan section 100 is incorporated into a tail section at the aft end 18, and such that the mean line 15 extends therethrough. Still more specifically, the fan section 100 may be positioned at a region of the aft end 18 of the fuselage 12 at the tail section where thick fluid boundary layers from the outer surface 38 of the fuselage 12 create a relatively large region of low momentum fluid. The placement of the fan section 100 at the aft end 18 of the fuselage 12 to ingest a relatively low momentum boundary layer fluid increases the efficiency of the aircraft 10. The translating fan blades 102 of the fan section 100 may avoid contact with the ground during aircraft takeoff roll and landing. In another embodiment, the translating fan blades 102 may position the first radial position 121 of the outer end 120 of the fan blades 102 within 100% of the fluid boundary layer, or a lesser portion thereof to maximize efficiency. In yet another embodiment, the translating fan blades 102 may position the second radial position 122 of the outer end 120 of the fan blades 102 to avoid ground contact during takeoff roll or landing, and position the first radial position 121 within a portion of the fluid boundary layer that may yield maximum efficiency. For example, the translating fan blades 102 may position the outer end 120 within 60% of the fluid boundary layer, or 50%, or 45%, etc. during takeoff or landing while avoiding contact with the ground. Still further, as boundary layer conditions change, the fan section 100 may re-position the outer end 120 of the fan blades 102 from the first radial position 121 to the second radial position 122 to maximize efficiency.

The fuselage 12 extends longitudinally from the forward end 16 of the aircraft 10 towards the aft end 18 of the aircraft 10, and includes a plurality of wings 20 of the aircraft 10 attached thereto. As used herein, the term "fuselage" generally includes all of the body of the aircraft 10, including an empennage or tail section of the aircraft 10. The first of such wings 20 extends laterally outwardly with respect to the longitudinal centerline 14 from a port side 22 of the fuselage 12 and the second of such wings 20 extends laterally outwardly with respect to the longitudinal centerline 14 from a starboard side 24 of the fuselage 12. Each of the wings 20 for the exemplary embodiment depicted includes one or more leading edge flaps 26 and one or more trailing edge flaps 28. The fuselage 12 further includes the vertical stabilizer 30, including a rudder flap 32 for yaw control, and a pair of horizontal stabilizers 34 each having an elevator flap 36 for pitch control. The fuselage 12 additionally includes an outer surface or skin 38. It should be appreciated however, that in other exemplary embodiments of the present disclosure, the aircraft 10 may additionally or alternatively include any other suitable configuration of stabilizer that may or may not extend directly along the vertical direction V or horizontal/lateral direction L. Such examples include, but are not limited to, T-tail, cruciform tail, twin or triple tails, or V-tails.

The exemplary powerplant 90 included in the aircraft 10 shown in FIGS. 6 and 7 includes one or more gas turbine engines 92 and a fan section 100. The one or more gas turbine engines 92 generate an amount of thrust, and further may produce power to drive the fan section 100. As will be appreciated, the fan section 100 is, for the embodiment depicted, attached to the aft end of the aircraft, to the fuselage of the aircraft. The fan section 100 may ingest and re-energize a boundary layer airflow over the fuselage of the aircraft to improve a propulsive efficiency of the aircraft. Although the fan section 100 is depicted as a ducted aft engine (i.e. including an outer nacelle), in other embodiments the fan section 100 may be an unducted fan section 100. For example, in certain embodiments, the fan section 100 may include one or more fan blades 102 that translate between an extended position and a retracted position to increase a ground clearance during takeoff and landing. More specifically, in certain embodiments, the fan section 100 may be configured in accordance with one or more of the embodiments described above with reference to FIGS. 1-5.

Referring still to FIGS. 6 and 7, the powerplant 90 may further include an electrical powertrain 94 to convert, store, and distribute electrical energy to the fan section 100. In one embodiment, the engines 92 include electrical generators to provide energy for the aircraft 10 and the fan section 100. In another embodiment, as shown in FIG. 6, the powerplant 90 includes at least one electrical generator 96 separate from the engines 92. For example, the electrical generators 96 may include auxiliary power units (APUs) placed within the wings 20 or at the empennage near the aft end 18 of the aircraft 10. The engines 92 or electrical generators 96 transmit electrical energy to an energy storage device 95. The energy storage device 95 may be, for example, but not limited to, capacitors, batteries, or fuel cells to store energy for later use.

The energy storage device 95 may be used to provide energy to operate the fan section 100 to generate propulsive force or to translate the outer end 120 of the fan blades 102 independently of the power output or rotational speed of the engines 92. For example, the fan section 100 may translate the fan blades 102 or to rotate and provide thrust while the engines 92 are non-operating, or while the engines 92 are operating at a reduced power output, using energy transmitted from the energy storage device 95.

The electrical powertrain 94 may further include a power conditioner 97, such as, for example, a rectifier, or transformer, or alternator. However, it should be understood that electrical generators 96 may include a power conditioning means that may obviate the inclusion of a separate power conditioner 97 (e.g. a variable frequency generator system as the electrical generator 96). Therefore, in other embodiments, the electrical generators 96 may be configured in direct communication with the energy storage device 95 without a separate power conditioner 97 therebetween. The electrical powertrain 94 may further include a communications apparatus 98 to distribute energy to the fan section 100 and to receive and communicate load requirements to and from the fan section 100.

It should be appreciated, however, that in other embodiments the present disclosure, the fan section 100 may instead receive mechanical energy from a powerplant 90 including engines 92 mounted at the aft end 18 of the fuselage 12 of the aircraft 10, such as e.g. at the vertical stabilizer 30, or the within the tail section of the fuselage 12, or along the port side 22 or starboard side 24 of the fuselage 12 at the aft end 18 of the aircraft 10. The engines 92 may transmit mechanical energy to the fan section 100 by mechanically coupling the fan section 100 to the engine 92, such as, for example, by coupling the shaft 106 of the fan section 100 to a shaft and/or gearbox of the engines 92. The engines 92 transmitting mechanical energy to the fan section 100 may include e.g. turbofan, turbojet, or turboprop engines that also provide propulsive thrust for the aircraft 10, or a turboshaft engine, such as an APU, to also provide electrical energy to the aircraft 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A single stage fan section mounted to an aircraft tail section, the fan section defining a radial direction, an axial direction and a circumferential direction, the fan section comprising:
    a shaft with a hub extending generally along a longitudinal axis; and
    a single stage fan comprising a plurality of fan blades rotatable with the shaft about the longitudinal axis, wherein each fan blade defines an outer end along the radial direction;
    wherein one or more of the plurality of fan blades translates a respective outer end along the radial direction from a first radial position to a second radial position; and
    wherein the first radial position is an extended position and the second radial position is a retracted position, the second radial position being approximately equal to an outer diameter of the hub.

2. The fan section of claim 1,
    wherein the hub comprises a sheath, wherein the sheath is disposed at least partially within the hub along the radial direction, and wherein the sheath translates one or more of the plurality of fan blades inward and outward of the sheath along the radial direction.

3. The fan section of claim 2, wherein the sheath is coupled to the shaft.

4. The fan section of claim 1, wherein each fan blade comprises at least one nested portion arranged along the radial direction, wherein the at least one nested portion translates inward and outward along the radial direction.

5. The fan section of claim 1, wherein the plurality of fan blades translates inwardly along the radial direction to a position representing at least a 25% decrease in the first radial position.

6. The fan section of claim 1, wherein one or more of the plurality of fan blades translates a respective outer end from the first radial position to the second radial position during a takeoff operating mode.

7. The fan section of claim 1, wherein the plurality of fan blades comprises at least three fan blades.

8. The fan section of claim 1, the fan section further comprising:
    a locking mechanism, wherein the locking mechanism positions the fan blades in a stationary position along the circumferential direction.

9. The fan section of claim 1, wherein each of the plurality of fan blades defines a pitch axis, and wherein the plurality of fan blades are each rotatable about their respective pitch axis.

10. The fan section of claim 1, wherein the fan section is a boundary layer ingestion fan section for ingesting and energizing a boundary layer airflow over the aircraft tail section.

11. The fan section of claim 1, wherein less than all of the plurality of fan blades translates its respective outer end from the first radial position to the second radial position.

12. The fan section of claim 1, wherein at least one of the plurality of fan blades is a radially stationary fan blade.

13. The fan section of claim 1, wherein one or more of the plurality of fan blades is configured to be in the second radial position inward of the first radial position during a takeoff operating mode, and is configured to be moved from the second radial position to the first radial position after the takeoff operating mode.

14. The fan section of claim 1, wherein moving one or more of the plurality of fan blades from the first radial position to the second radial position increases a ground clearance of the aircraft tail section.

15. A single stage fan section mounted to an aircraft tail section, the fan section defining a radial direction, an axial direction and a circumferential direction, the fan section comprising:
    a shaft extending generally along a longitudinal axis; and
    a single stage fan comprising a plurality of fan blades rotatable with the shaft about the longitudinal axis, wherein each fan blade defines an outer end along the radial direction;
    wherein one or more of the plurality of fan blades translates a respective outer end along the radial direction from a first radial position to a second radial position, the first radial position being an extended position and the second radial position being a retracted position;
wherein each fan blade comprises at least two nested portions; and
wherein the at least two nested portions translate inward and outward from one another along the radial direction.

16. The fan section of claim 15, wherein the fan section is a variable pitch fan.

17. A fan section mounted to an aircraft tail section, the fan section defining a radial direction, an axial direction and a circumferential direction, the fan section comprising:
    a shaft with a hub extending generally along a longitudinal axis; and
    a plurality of fan blades rotatable about the longitudinal axis, wherein each fan blade defines an outer end along the radial direction, and wherein one or more of the plurality of fan blades translates a respective outer end from a first radial position to a second radial position, the second radial position being approximately equal to an outer diameter of the hub;

wherein the fan section is a boundary layer ingestion fan section for ingesting and energizing a boundary layer airflow over the aircraft tail section; and wherein moving one or more of the plurality of fan blades from the first radial position to the second radial position increases a ground clearance of the aircraft tail section.

18. The fan section of claim 17, wherein the plurality of fan blades comprises a first plurality of fan blades and a second plurality of fan blades, wherein the first plurality of fan blades are spaced from the second plurality of fan blades along the longitudinal axis, wherein the first and second plurality of fan blades are in contrarotating arrangement.

\* \* \* \* \*